(12) United States Patent
Kim et al.

(10) Patent No.: US 9,448,128 B2
(45) Date of Patent: Sep. 20, 2016

(54) FORCE TORQUE SENSOR, FORCE TORQUE SENSOR FRAME, AND FORCE TORQUE MEASUREMENT METHOD

(71) Applicant: KOREA ELECTRONICS TECHNOLOGY INSTITUTE, Seongnam-si, Gyeonggi-d (KR)

(72) Inventors: Bongseok Kim, Incheon (KR); Junghoon Hwang, Seoul (KR); Changwoo Park, Seoul (KR); Taekeun Kim, Incheon (KR); Seungyun Choi, Wonju-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 48 days.

(21) Appl. No.: 14/399,002

(22) PCT Filed: May 10, 2013

(86) PCT No.: PCT/KR2013/004137
§ 371 (c)(1),
(2) Date: Nov. 5, 2014

(87) PCT Pub. No.: WO2013/169056
PCT Pub. Date: Nov. 14, 2013

(65) Prior Publication Data
US 2015/0135856 A1    May 21, 2015

(30) Foreign Application Priority Data

May 10, 2012   (KR) .................. 10-2012-0049864

(51) Int. Cl.
| | |
|---|---|
| G01L 1/22 | (2006.01) |
| G01L 3/10 | (2006.01) |
| G01L 5/16 | (2006.01) |
| G01L 3/14 | (2006.01) |

(52) U.S. Cl.
CPC .............. *G01L 1/22* (2013.01); *G01L 3/108* (2013.01); *G01L 5/161* (2013.01); *G01L 3/1457* (2013.01); *G01L 5/16* (2013.01)

(58) Field of Classification Search
CPC ......... G01L 5/161; G01L 5/16; G01L 3/108; G01L 3/1457; G01L 1/22
USPC .............................. 73/862.041–862.045, 777
See application file for complete search history.

(56) References Cited

U.S. PATENT DOCUMENTS

| 4,448,083 A * | 5/1984 | Hayashi ................. G01L 5/161 |
| | | 73/862.042 |
| 4,573,362 A * | 3/1986 | Amlani ................. G01L 1/2218 |
| | | 73/862.044 |

(Continued)

FOREIGN PATENT DOCUMENTS

| JP | 10078360 A | 3/1998 |
| KR | 1020070084807 A | 8/2007 |
| KR | 1020110058521 A | 6/2011 |

OTHER PUBLICATIONS

International Search Report for PCT/KR2013/004137 dated Jun. 27, 2013, citing the above reference(s).

*Primary Examiner* — Max Noori
(74) *Attorney, Agent, or Firm* — Hauptman Ham, LLP

(57) ABSTRACT

The present invention relates to a force torque sensor, a force torque sensor frame, and a force torque measurement method. The force torque sensor includes a central hub, a plurality of beams each having one side connected to the hub, and a rim connected to the other side of each beam to surround the hub and the plurality of beams. The force torque measurement method includes: a step of forming a gradient shape in a longitudinal direction thereof so that a section is provided in which a strain rate on each of the beams due to a force or torque is maintained within a predetermined value; and a step of measuring a strain rate in X-axis, Y-axis, or Z-axis directions after a strain gauge is attached to a corresponding section. Thus, a measurement center of the strain gauge may be positioned within a predetermined section.

15 Claims, 13 Drawing Sheets

(56) References Cited

U.S. PATENT DOCUMENTS

| | | | | |
|---|---|---|---|---|
| 4,640,138 A | * | 2/1987 | Meyer | G01L 5/226 73/862.044 |
| 6,038,933 A | * | 3/2000 | Meyer | G01L 1/2206 73/146 |
| 7,743,672 B2 | * | 6/2010 | Kurtz | G01L 3/1457 73/862.041 |

* cited by examiner

| | Strain No. | Fx | Fy | Fz | Mx | My | Mz |
|---|---|---|---|---|---|---|---|
| Strain Gauge Set For Sensing Fx | 1 | 340.528 | 7.698 | 0.082 | -0.228 | -0.103 | 797.042 |
| | 2 | -340.545 | 7.708 | -0.060 | 0.168 | -0.021 | -797.066 |
| | 3 | 340.772 | -7.700 | 0.000 | 0.023 | 0.199 | -797.627 |
| | 4 | -340.999 | -7.688 | -0.060 | -0.172 | 0.185 | 798.150 |
| Strain Gauge Set For Sensing Fy | 5 | -7.692 | 340.515 | 0.098 | 0.162 | -0.226 | 797.055 |
| | 6 | -7.702 | -341.119 | 0.041 | 0.187 | -0.142 | -798.472 |
| | 7 | 7.682 | 341.298 | 0.023 | -0.130 | 0.063 | -798.867 |
| | 8 | 7.741 | -341.041 | -0.094 | 0.090 | -0.257 | 798.259 |
| Strain Gauge Set For Sensing Fz | 9 | -0.041 | 4.631 | 361.655 | -929.314 | -0.161 | -0.085 |
| | 10 | -0.034 | 4.619 | -361.692 | 929.379 | 0.112 | -0.055 |
| | 11 | 0.018 | -4.620 | 361.786 | 929.618 | -0.146 | -0.077 |
| | 12 | 0.016 | -4.626 | -361.550 | -929.011 | 0.045 | -0.046 |
| Strain Gauge Set For Sensing Mx | 13 | -0.020 | 4.764 | -132.309 | 345.713 | 0.093 | -0.055 |
| | 14 | -0.033 | 4.737 | 131.967 | -344.853 | -0.077 | -0.079 |
| | 15 | -0.081 | -4.745 | 132.090 | 345.161 | -0.334 | 0.191 |
| | 16 | 0.106 | -4.756 | -132.384 | -345.944 | -0.484 | -0.251 |
| Strain Gauge Set For Sensing My | 17 | -4.772 | -0.024 | -132.281 | -0.108 | 345.646 | -0.059 |
| | 18 | -4.739 | -0.021 | 132.017 | 0.016 | -344.979 | -0.032 |
| | 19 | 4.751 | -0.101 | 132.088 | 0.432 | 345.140 | 0.234 |
| | 20 | 4.751 | 0.112 | -132.399 | 0.480 | -345.974 | -0.260 |
| Strain Gauge Set For Sensing Mz | 21 | 6.980 | 137.151 | -0.053 | 0.003 | -0.130 | -344.854 |
| | 22 | 7.005 | -137.538 | 0.027 | 0.037 | 0.062 | 345.816 |
| | 23 | -6.990 | -137.132 | -0.029 | -0.042 | 0.073 | -344.869 |
| | 24 | -6.997 | 137.510 | 0.037 | -0.043 | -0.089 | 345.753 |

FIG. 12

| | Fx | Fy | Fz | Mx | My | Mz |
|---|---|---|---|---|---|---|
| Strain Gauge Set For Sensing Fx | 3467.715 | -0.005 | 0.050 | -0.050 | -0.017 | -0.417 |
| Strain Gauge Set For Sensing Fy | -0.012 | 3460.993 | 0.043 | -0.061 | 0.059 | -0.400 |
| Strain Gauge Set For Sensing Fz | -0.001 | 0.004 | 3461.071 | -0.016 | -0.116 | -0.015 |
| Strain Gauge Set For Sensing Mx | -0.044 | 0.009 | 0.050 | 345.218 | 0.080 | 0.117 |
| Strain Gauge Set For Sensing My | -0.008 | -0.054 | 0.047 | -0.043 | 345.435 | 0.117 |
| Strain Gauge Set For Sensing Mz | -0.005 | 0.012 | -0.036 | -0.008 | -0.007 | 345.323 |

FIG. 13

FORCE TORQUE SENSOR, FORCE TORQUE SENSOR FRAME, AND FORCE TORQUE MEASUREMENT METHOD

CROSS-REFERENCE TO RELATED APPLICATION

This application claims priority to and the benefit of Korean Patent Application No. 10-2012-0049864 filed in the Korean Intellectual Property Office on May 10, 2012, the entire contents of which are incorporated herein by reference.

TECHNICAL FIELD

The present invention relates to a force torque measurement method, and more particularly, to a force torque sensor, a force torque sensor frame, and a force torque measurement method, in which there is a section in which a strain rate on each of beams included in a force torque sensor due to a force or torque is maintained below a certain value and a strain gauge is attached to the section to measure a force or torque.

BACKGROUND

Machines such as industrial robots are provided with sensors for measuring force or torque that is applied during work.

Such a sensor may prevent a machine failure or a safety accident, and promptly recognizes an unexpected accident to enable a quick response.

A sensor configured to perform the above-described function includes, for example, a differential transformer sensor that uses the difference between magnetizations of a tense direction or compression direction when stress is applied to a ferromagnetic material, a phase difference detection sensor that detects a torsional angle caused by a torque load, and a sensor using a strain gauge.

The sensor using a strain gauge has a problem in that a relatively accurate strain measurement is enabled only when a point at which deformation such as a tension or compression has occurred due to force or torque is found and the strain gauge is attached to the correct point.

In this case, a solution that can improve inconvenience in measuring a strain and also enhance accuracy of the measurement value is needed

SUMMARY

The present invention is directed to providing a force torque sensor, a force torque sensor frame, and a force torque measurement method, which can increase accuracy of force torque measurement while enabling the strain gauge to be attached to a frame of the force torque sensor and may measure all of 1-axis to 6-axis strains.

One aspect of the present invention provides a force torque sensor including a central hub, a plurality of beams each having one side connected to the hub and having a gradient shape in a longitudinal direction thereof, a strain gauge attached to one of the beams to measure a strain rate of the beam, and a rim connected to another side of the beam to surround the hub and the beams.

The beam may have a section in which a strain rate due to a force or torque along the gradient shape is maintained below a certain value, and the strain gauge may be attached to the section.

The section may have a length of 1.5 mm to 2.0 mm in the longitudinal direction of the beam.

The section may have a difference between a maximum value and a minimum value of 20 um/m or less.

The strain gauge may be attached such that a measurement center thereof is positioned within the section.

The strain gauge may measure a strain rate due to a force or torque in a direction of an X axis, a Y axis, or a Z axis.

The strain gauge may be provided as a plurality of gauges positioned on both surfaces opposite to each other with respect to the beam in order to measure a strain rate in a single axis direction.

Two strain gauges may be positioned opposite to each other with respect to a single beam, and the strain rate due to the force or torque in the single axis direction may be measured using four strain gauges attached to two beams.

The plurality of beams may be positioned symmetrically with respect to the hub.

The number of beams may be four, and the four beams may form a cross centered on the hub.

The hub, the beam, or the rim may be formed of iron steel, nickel-chromium-molybdenum steel, stainless steel, tool steel, hardened stainless steel, an aluminum alloy, or the material duralumin.

Another aspect of the present invention provides a force torque sensor frame including a central hub, a plurality of beams each having one side connected to the hub, having a gradient shape in a longitudinal direction thereof, and having a strain gauge attached thereon, and a rim connected to another side of the beam to surround the hub and the beams.

The beam may have a section in which a strain rate due to a force or torque along the gradient shape is maintained below a certain value, and the strain gauge may be attached to the section.

The hub, the beam, or the rim may be formed of iron steel, nickel-chromium-molybdenum steel, stainless steel, tool steel, hardened stainless steel, an aluminum alloy, or the material duralumin.

Still another aspect of the present invention provides a force torque measurement method using a force torque sensor including a central hub; a beam having one side connected to the hub, and a rim connected to another side of the beam to surround the hub and the beams, the force torque measurement method including a processing step of forming a gradient in a longitudinal direction thereof such that the beam has a section in which a strain rate due to a force or torque is maintained below a certain value, an attachment step of attaching a strain gauge to the section, and a measurement step of measuring the strain rate in a direction of an X axis, a Y-axis, or a Z axis using the attached strain gauge.

According to the force torque sensor, the force torque sensor frame, and the force torque measurement method, the following effects may be expected.

First, the strain gauge provided in the force torque sensor may be easily attached since the beam of the force torque sensor has a section in which a strain rate due to a torque is maintained below a certain value.

Second, the accuracy of the measurement of the strain rate due to the force and torque may be enhanced by positioning the measurement center of the strain gauge within the certain section.

Third, without needing to employ a separate element to smoothly measure the strain rate, the force torque sensor may be produced by processing the beam to have a certain gradient shape, thus facilitating the production thereof.

Fourth, it is possible to minimize and lighten the force torque sensor by employing a cross beam structure for performing a function of one-axis to six-axis force torque sensors and a material considering physical properties such as density and Young's modulus.

BRIEF DESCRIPTION OF DRAWINGS

FIG. 12 is a view showing the measurement values of the strain rate by the strain gauge according to the third embodiment.

FIG. 13 shows a result of calculating a strain of each axis direction according to a result of FIG. 12.

DETAILED DESCRIPTION

Figure 1:
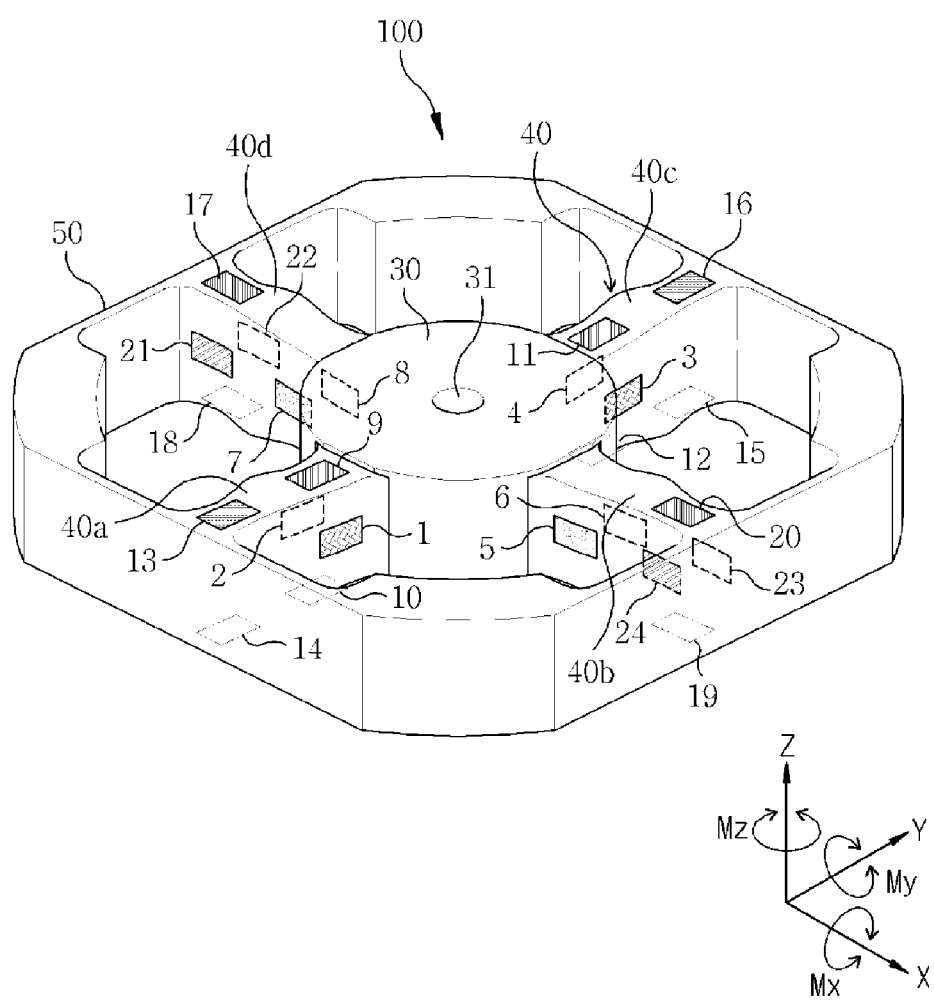
FIG. 1 is a perspective view showing a configuration of a force torque sensor according to a first embodiment of the present invention.

Hereinafter, it is noted that only parts necessary to understand exemplary embodiments of the present invention will be described, and description of other parts will be omitted to avoid obscuring the subject matter of the present invention.

The terms or words used in the specification and claims should not be construed as being limited to typical or dictionary meanings, but construed with the meanings and concepts corresponding to the technical idea of the present invention on the basis of the principle that an inventor can appropriately define the concepts of the terms for describing his or her invention in the best method. Accordingly, the configurations illustrated in embodiments and drawings described in the specification do not represent the technical idea of the present invention but are merely exemplary embodiments. Thus, it should be understood that various equivalents and modifications may exist which can be replaced at a time at which this specification is applied.

Deformation occurs when a certain object is tensed or compressed due to a force or torque. A strain gauge is an apparatus that measures a degree of deformation (hereinafter referred to as a strain rate).

Such a strain gauge is widely used in fields concerned with interpretation and design of mechanical elements such as machine building, aviation, and shipbuilding. For example, when the strain gauge is attached to a certain object and a force or torque is applied to the object, the length of the object is changed. The strain gauge uses the change to measure the strain rate.

The strain gauge includes a structure in which several strands of fine lines, a resistance film, and a semiconductor are arranged on an electric heating body of a thin film, and measures the strain rate of the object according to change in a resistance value of a resistor that is deformed when the length of the object changes due to a force or torque at a point at which the strain gauge is attached.

However, for a sensor using the strain gauge to measure the force or torque acting on a certain object, an external force acting on the object exerts an influence and an error occurs in the measurement value due to mutual interference. For example, when the strain rate due to a force acting on a certain axis is measured, a gauge that measures a strain rate due to a force or torque of another axis may show an effective value. The error due to mutual interference of the force torque sensor is closely associated with an error in attachment of the strain gauge.

The force torque sensor may measure a strain rate through a structure attached to the specific position that is deformed due to the force or torque and correct the error using a specific equation. For this, the strain gauge is required to be accurately attached to a measurement point of the strain rate. However, precision of the attachment decreases due to inaccuracy of a process, resulting in an error in measurement of the strain gauge.

The present invention proposes a force torque sensor, a force torque sensor frame, and a force torque measurement method that may minimize a measurement error of the strain gauge to accurately measure the strain rate due to the force or torque.

Hereinafter, embodiments of the present invention will be described in detail with reference to the accompanying drawings.

Figure 2:
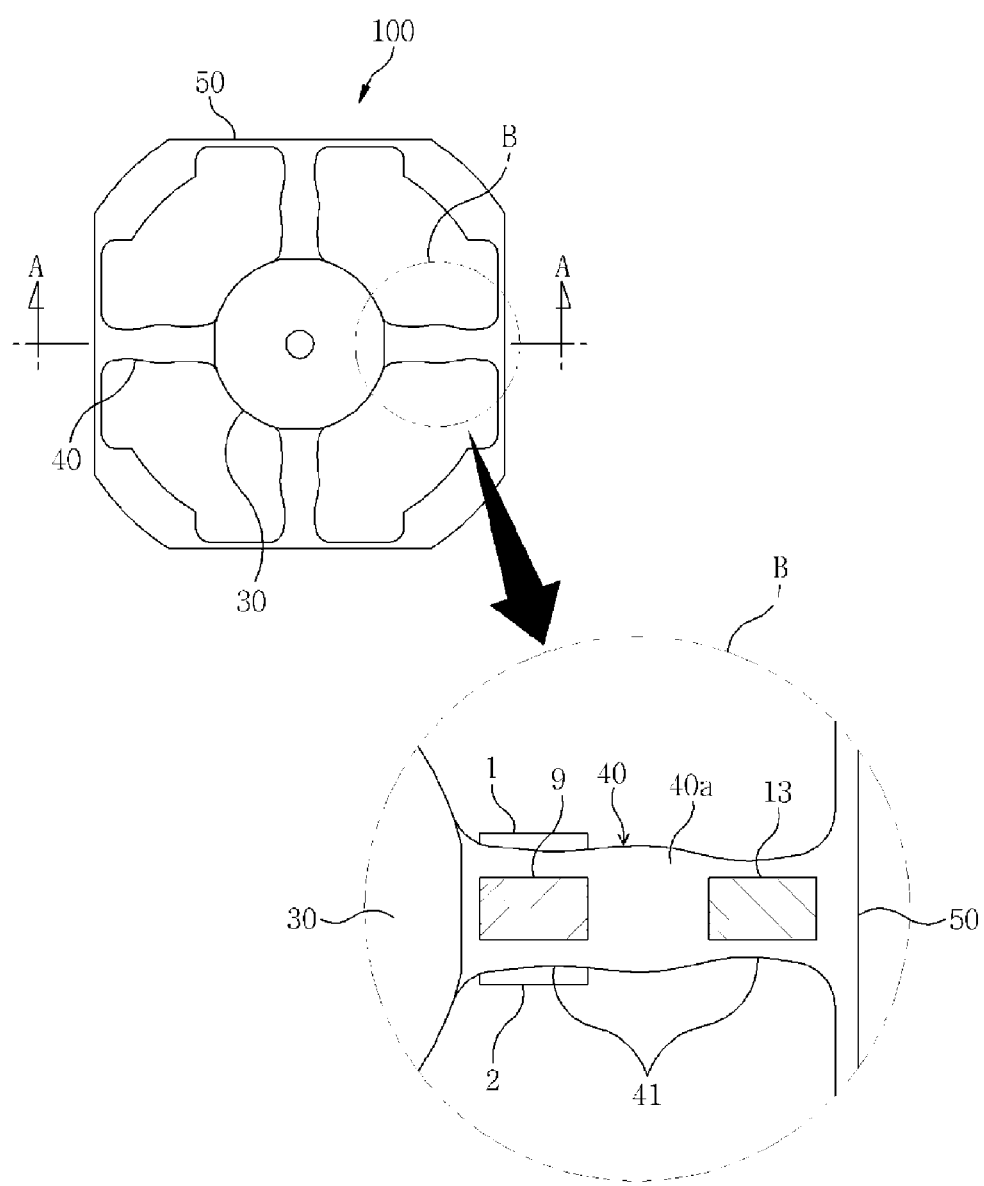
FIG. 2 is a top view showing the force torque sensor of the first embodiment and a partial top view of region B.
Figure 3:
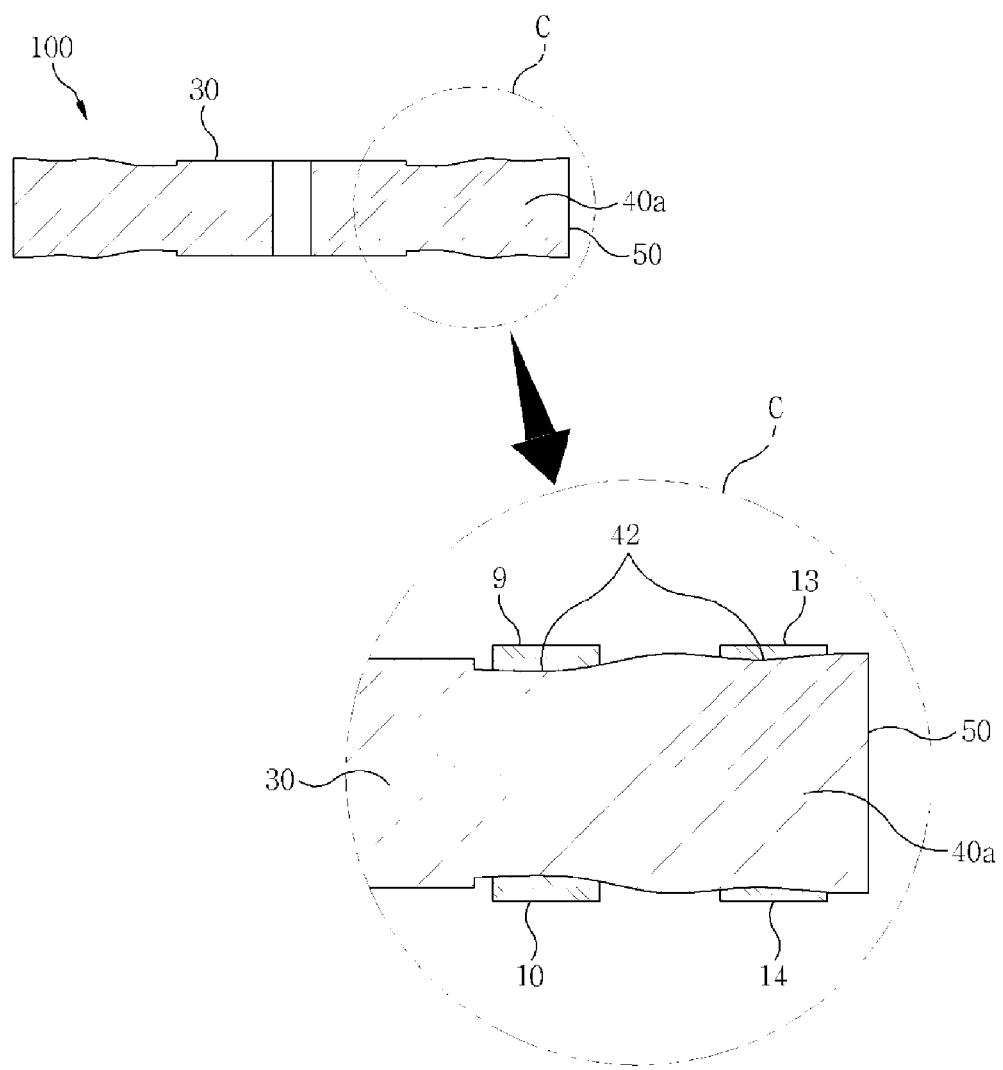
FIG. 3 is a cross-sectional view of line A-A and a partial cross-sectional view of region C in the first embodiment shown in FIG. 2.

FIG. 1 is a perspective view showing a configuration of a force torque sensor 100 according to a first embodiment of the present invention. FIG. 2 is a top view showing the force torque sensor of the first embodiment and a partial top view of region B. FIG. 3 is a cross-sectional view of line A-A and a partial cross-sectional view of region C in the first embodiment shown in FIG. 2.

Referring to FIGS. 1 to 3, a force torque sensor 100 of the first embodiment includes a hub 30, a beam 40, a rim 50, and strain gauges 1 to 24.

The hub 30 of the first embodiment is positioned at the center of the force torque sensor 100 and has a through hole 31 that may be coupled with a separate rotation member to measure a force or torque.

The beam 40 has one side connected with the hub 30 and the other side connected with the rim 50 and has a gradient shape curved in a longitudinal direction.

The beam 40 of the first embodiment may have one or more gradient shapes at a top surface, a bottom surface, and both side surfaces.

In the first embodiment, the beam 40 has a cross form connected with the hub 30 and includes a total of four individual beams 40a, 40b, 40c, and 40d.

The rim 50 is connected to the other side of the beam 40 and formed to surround the hub 30 and the beam 40.

A frame of the force torque sensor 100 configured of the hub 30, the beam 40, and the rim 50 of the first embodiment may be formed of steel, nickel-chromium-molybdenum steel, stainless steel, tool steel, hardened stainless steel, an aluminum alloy, or the material duralumin.

The strain gauges 1 to 24 that measure a strain rate of the beam 40 are attached to certain positions of the beam 40.

The beam 40 of the first embodiment has a gradient shape and thus a section in which a value obtained by measuring a strain rate of the beam 40 using the strain gauges 1 to 24 is maintained below a certain value with respect to a certain force or torque.

If the beam does not have the gradient shape, a strain rate due to a force or torque is measured as a greater value at a position closer to the hub 30, and measured as a smaller value as the strain rate progressively decreases in a direction toward the rim 50, that is, an opposite direction. In this case, in order to measure a strain rate at a certain point, a measurement center of any one of the strain gauges 1 to 24 should be precisely consistent with the position to obtain a correct measurement value.

On the other hand, the beam 40 of the first embodiment has a strain rate that decreases in a direction from the hub 30 to the rim 50 but has one or more sections in which the strain rate is maintained substantially constant below a certain value. Accordingly, in the first embodiment, it is possible to obtain a correct measurement value of a strain rate by attaching any one of the strain gauges 1 to 24 such that the measurement center thereof is positioned within the section.

For example, when a target measurement value of the strain rate due to the force or moment is set as about 300 um/m, and the force torque sensor 100 is produced, a length of the section in which the strain rate is maintained below a certain value may be about 1.5 mm to about 2.0 mm. More specifically, the section is about 1.5 mm long or less when the strain rate due to the force is measured with the strain gauge and about 2.0 mm long or less when the strain rate due to the torque is measured.

In this section, a difference between a maximum value and a minimum value of the strain rate due to the force is about 20 um/m or less, and a difference between a between a maximum value and a minimum value of the strain rate due to the torque is also about 20 um/m or less.

Such operating characteristics of the first embodiment permits the measurement center to be positioned within a certain range rather than at a certain point when the strain gauges 1 to 24 are attached to the beam 40, thus providing ease in the process of producing the force torque sensor 100 and also accuracy of the measurement of the strain rate. Such technical features will be described in detail below with reference to other drawings.

In the first embodiment, the strain gauges 1 to 24 may measure all of strain rates due to forces or torques acting in directions of an X axis, a Y axis, and a Z axis. This means that the force torque sensor 100 of the first embodiment may perform all functions of 1-axis to 6-axis sensors.

In the first embodiment, in order to measure a strain rate due to a force Fx acting in a direction of the X axis, four strain gauges 1 to 4 are attached to the beam 40.

In this case, the strain gauge 1 and the strain gauge 2 are positioned on both side surfaces of the beam 40a opposite to each other, and the strain gauge 3 and the strain gauge 4 are positioned on both side surfaces of the beam 40c opposite to each other.

When a force acts in the X-axis direction of the force torque sensor 100, internal resistance values of the strain gauges 1 to 4 may change with the change in length of the beams 40a and 40c. In this case, the strain rate may be computed by forming a Wheatstone bridge circuit including the internal resistances of the strain gauges 1 to 4, applying an input voltage, and measuring change in an output voltage.

Likewise, in order to measure a strain rate due to a force Fy acting in the Y-axis direction, the strain gauge 5 and the strain gauge 6 are attached to both side surfaces of the beam 40b opposite to each other, and the strain gauge 7 and the strain gauge 8 are attached to both side surfaces of the beam 40d opposite to each other.

In order to measure a strain rate due to a force Fz acting in the Z-axis direction, the strain gauge 9 and the strain gauge 10 are attached to a top surface and a bottom surface of the beam 40a opposite to each other, and the strain gauge 11 and the strain gauge 12 are attached to a top surface and a bottom surface of the beam 40c opposite to each other.

In order to measure a strain rate due to a torque Mx acting in the X-axis direction, the strain gauge 13 and the strain gauge 14 are attached to a top surface and a bottom surface of the beam 40a opposite to each other, and the strain gauge 16 and the strain gauge 15 are attached to a top surface and a bottom surface of the beam 40c opposite to each other.

In order to measure a strain rate due to a torque My acting in the Y-axis direction, the strain gauge 17 and the strain gauge 18 are attached to a top surface and a bottom surface of the beam 40d opposite to each other, and the strain gauge 20 and the strain gauge 19 are attached to a top surface and a bottom surface of the beam 40b opposite to each other.

In order to measure a strain rate due to a torque Mz acting in the Z-axis direction, the strain gauge 21 and the strain gauge 22 are attached to both side surfaces of the beam 40d opposite to each other, and the strain gauge 24 and the strain gauge 23 are attached to both side surfaces of the beam 40b opposite to each other.

The left view of FIG. 2 is a top view showing the force torque sensor 100 of the first embodiment, and the right view of FIG. 2 is a partial top view showing enlarged region B.

In the partial top view shown at the right of FIG. 2, the beam 40a includes a gradient shape 41 in which the side surfaces are symmetrical to each other and uniformly curved.

In this case, the strain gauges 1 and 2 that measure a strain rate due to a force acting in the X-axis direction are positioned on both side surfaces of the beam 40a opposite to each other. The strain gauge 9 that measures a strain rate due to a force acting in the Z-axis direction and the strain gauge 13 that measures a strain rate due to a torque acting in the X-axis direction are positioned on the top surface of the beam 40a.

In FIG. 2, the strain gauge 10 that measures a strain rate due to a force acting in the Z-axis direction is positioned on a bottom surface of the beam 40a opposite to a position to which the strain gauge 9 is attached. In addition, the strain gauge 14 that measures a strain rate due to a torque acting in the X-axis direction is positioned on a bottom surface of the beam 40a opposite to a position to which the strain gauge 13 is attached.

The left view of FIG. 3 is a cross-sectional view along line A-A of the first embodiment shown in FIG. 2, and the right view of FIG. 3 is a partial cross-sectional view showing enlarged region C in the left view.

In the partial cross-sectional view shown in the right side of FIG. 3, the beam 40a includes a gradient shape 42 in which the top surface and the bottom surface are uniformly curved.

In this case, the strain gauges 9 and 10 that measure a strain rate due to a force acting in the Z-axis direction are positioned on the top surface and the bottom surface of the beam 40a opposite to each other. The strain gauges 13 and 14 that measure a strain rate due to a torque acting in the X-axis direction are positioned on the top surface and the bottom surface of the beam 40a opposite to each other.

In the first embodiment described with reference to FIGS. 2 and 3, positions to which the respective strain gauges 1, 2, 9, 10, 13, and 14 are attached along a length direction of the beam 40a are experimentally found, and the positions are within a section in which a difference between a maximum value and a minimum value of the strain rate is maintained below a certain value. That is, the strain gauges 1, 2, 9, 10, 13, and 14 are attached to the beam 40a such that the measurement centers thereof are positioned within the section.

A result of measuring the strain rate due to the force or torque according to the second embodiment of the present invention will be described in more detail with reference to FIGS. 4 to 10.

Figure 4:
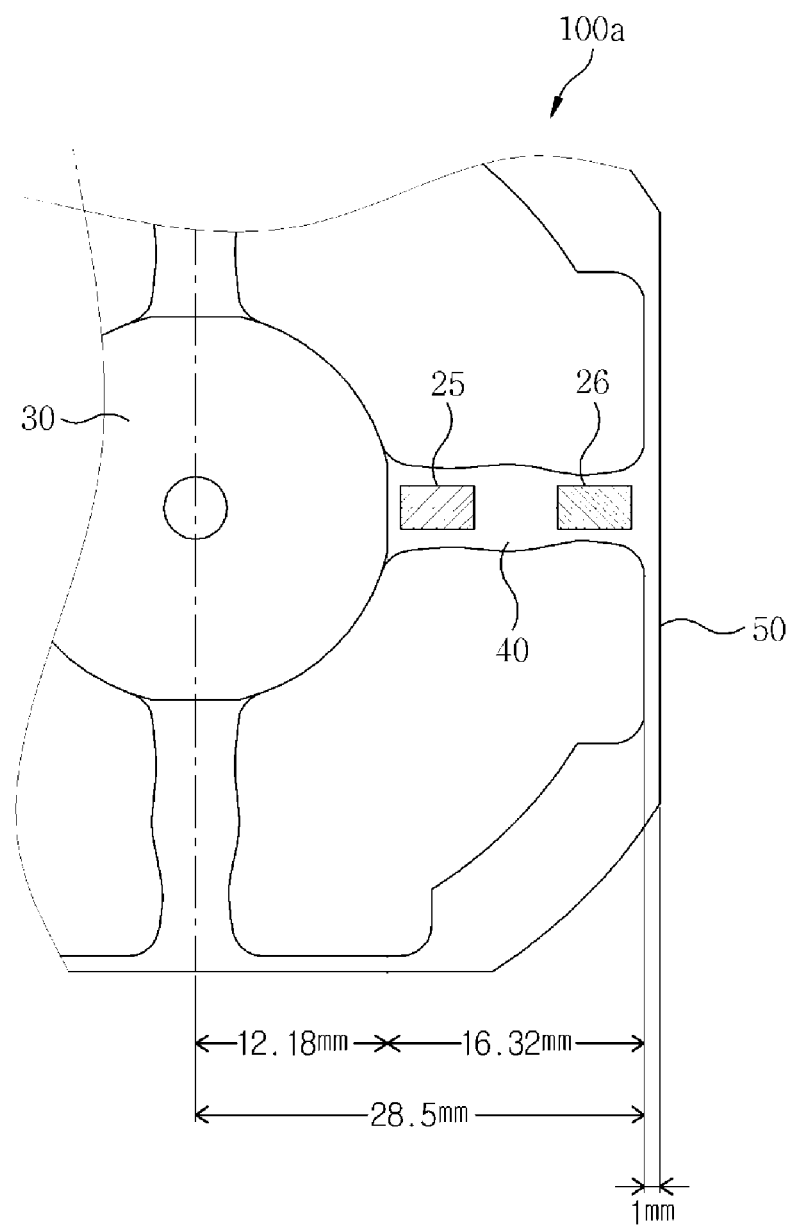
FIG. 4 is a partial top view showing a position at which a strain gauge is attached according to a second embodiment of the present invention.

FIG. 4 is a partial top view showing a position at which strain gauges 25 and 26 are attached to the force torque sensor 100a according to a second embodiment of the present invention. FIGS. 5 to 10 are views showing measurement values of the strain rate according to the second embodiment.

Referring to FIG. 4, in the force torque sensor 100a of the second embodiment, a radius of a cylinder hub 30 is 12.18 mm, a length of the beam 40 is 16.32 mm, and a thickness of a part connected with the beam is 1 mm.

In the force torque sensor 100a of the second embodiment, a frame configured of the hub 30, the beam 40, and the rim 50 may be formed of steel, nickel-chromium-molybdenum steel, stainless steel, tool steel, hardened stainless steel, an aluminum alloy, or the material duralumin.

For example, physical properties of AISI 4340 that is a kind of steel, 630 Stainless that is a kind of stainless steel, Al 7075 T6 that is a kind of duralumin, and Beryllium Copper 25 that is a kind of alloy are compared as follows.

TABLE 1

| | Density (g/cm3) | Young's modulus (GPa) | Yield strength (MPa) | Thermal expansion coefficient | Elongation (%) |
|---|---|---|---|---|---|
| AISI 4340 | 7.85 | 207 | 1449 | 11.34 | 12 |
| 630 Stainless | 8 | 196.5 | 1276.5 | 10.8 | 14 |
| Al 7075 T6 | 2.81 | 71.1 | 503 | 23.4 | 11 |
| Beryllium Copper 25 | 8.36 | 117.3 | 1173 | 16.74 | 3 |

The density is a mass per unit volume.

The Young's modulus is a proportional coefficient when a stress proportional to a linear strain rate is computed.

The yield strength is a limited value at which elastic deformation occurs when a stress is applied to an object.

The thermal expansion coefficient is an expansion ratio of an object through thermal expansion The elongation is a rate at which a material is elongated when a force is applied.

In Table 1, AISI 4340 that is a kind of steel has a high density and Young's modulus but high yield strength and a low thermal expansion coefficient and thus is a material suitable for producing the force torque sensor 100a.

On the other hand, Al 7075 T6 that is a kind of duralumin is characterized by relatively low density that enables lightening and a low Young's modulus that results in a relatively high strain rate due to the force or torque.

The second embodiment may employ various materials according to usability of the force torque sensor 100a and thus does not limit its technical scope to a specific material.

Figure 5:
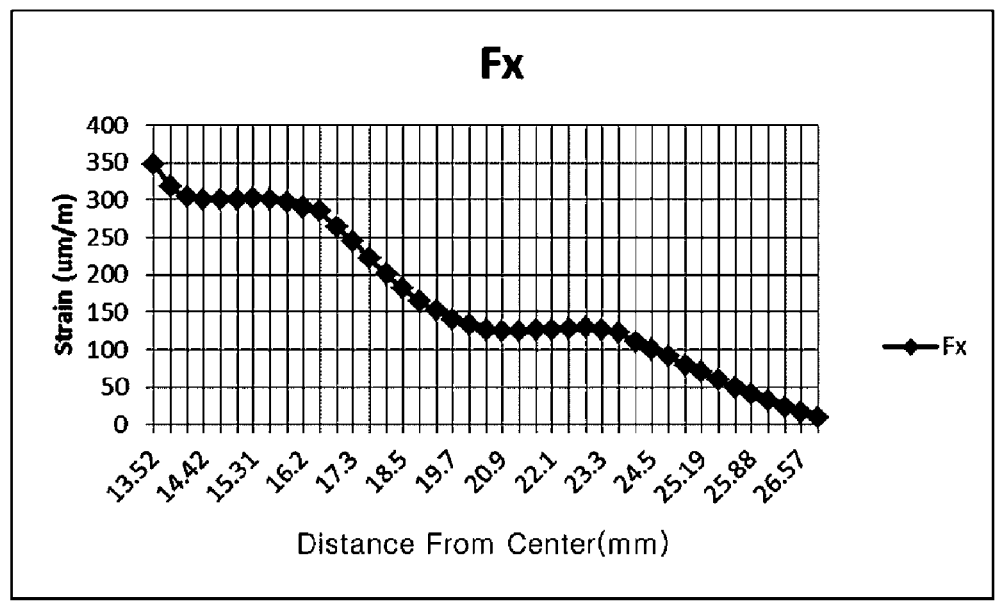
FIGS. 5 to 10 are views showing measurement values of the strain rate according to the second embodiment.
Figure 6:
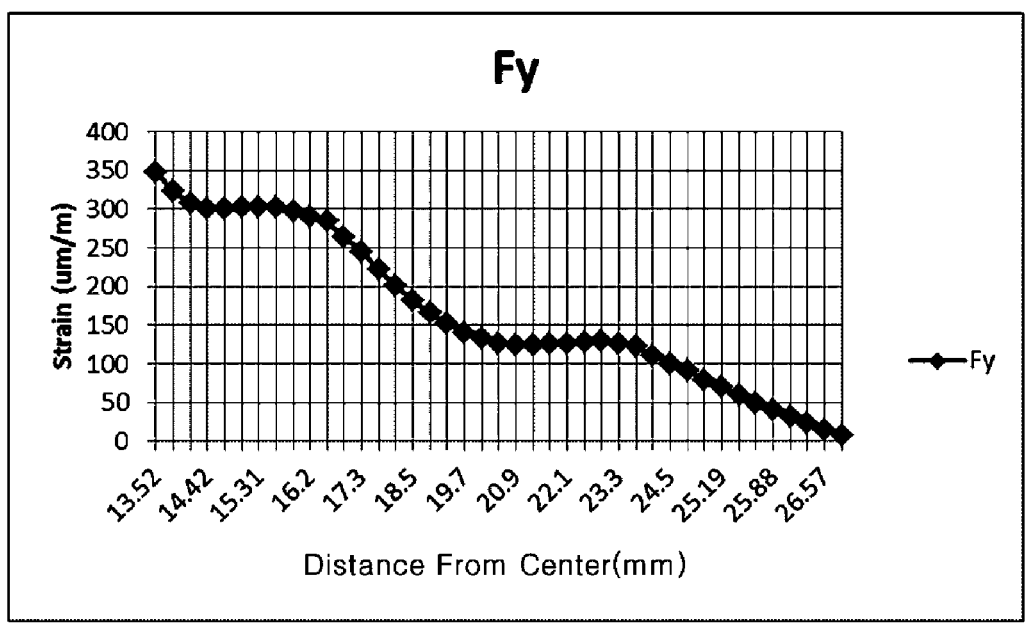

FIGS. 5 and 6 are result values obtained by forming the hub 30, the beam 40, and the rim 50 of Al 7075 T6 that is a kind of duralumin, applying a force or torque in a direction of each axis of the beam 40, and measuring a strain rate at each position of the beam 40.

In each of FIGS. 5 to 10, the horizontal axis indicates a distance from a center of the hub 30, which is represented in mm, and the vertical axis indicates a strain rate at a point, which is represented in um/m.

FIG. 5 is a graph showing a result of applying a force Fx of 200 N in the X-axis direction and measuring a strain rate at each point of the beam 40, and FIG. 6 is a graph showing a result of applying a force Fy of 200N in the Y-axis direction and measuring a strain rate at each point of the beam.

Referring to FIGS. 5 and 6, in a section between about 14.12 mm and about 15.91 mm from the center of the hub 30, the difference between the maximum value and the minimum value of the strain rate is 20 um/m or less. In addition, in a section between about 20.5 mm and about 23.3 mm from the center of the hub 30, the difference between the maximum value and the minimum value of the strain rate is 20 um/m or less.

Figure 7:
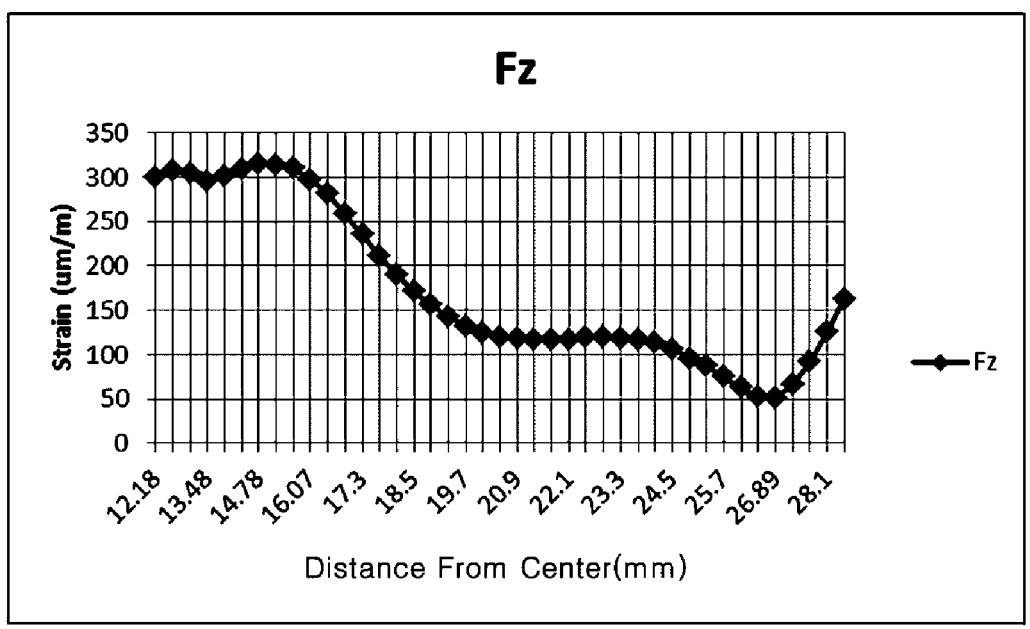

FIG. 7 is a graph showing a result of applying a force Fz of 500 N in the Z-axis direction and measuring a strain rate at each point of the beam 40.

Referring to FIG. 7, in a section between about 13.91 mm and about 15.64 mm from the center of the hub 30, the difference between the maximum value and the minimum value of the strain rate is 20 um/m or less. In addition, in a section between about 20.5 mm and about 23.7 mm from the center of the hub 30, a difference between a maximum value and a minimum value of the strain rate is 20 um/m or less.

Figure 8:
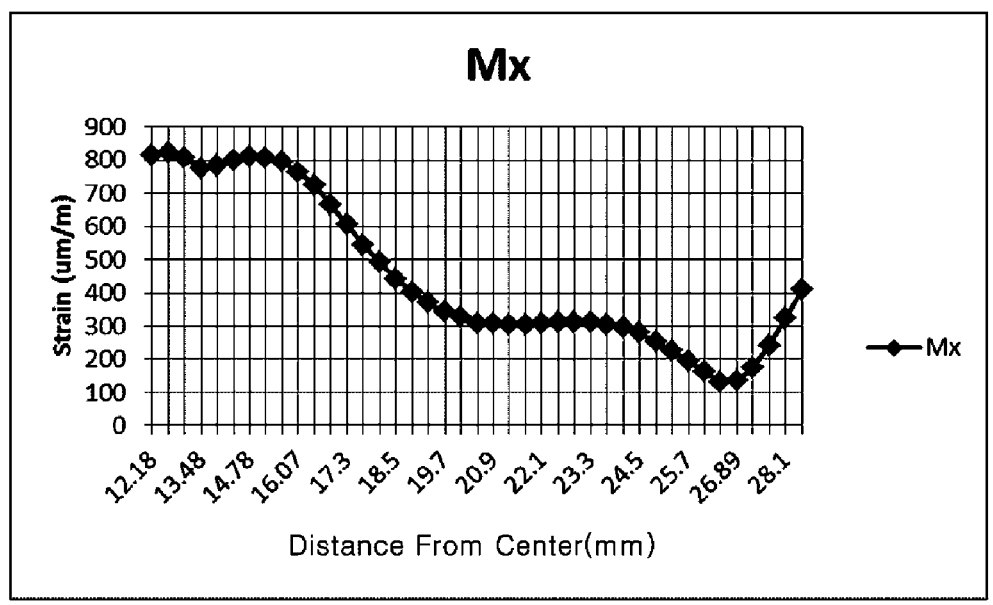
Figure 9:
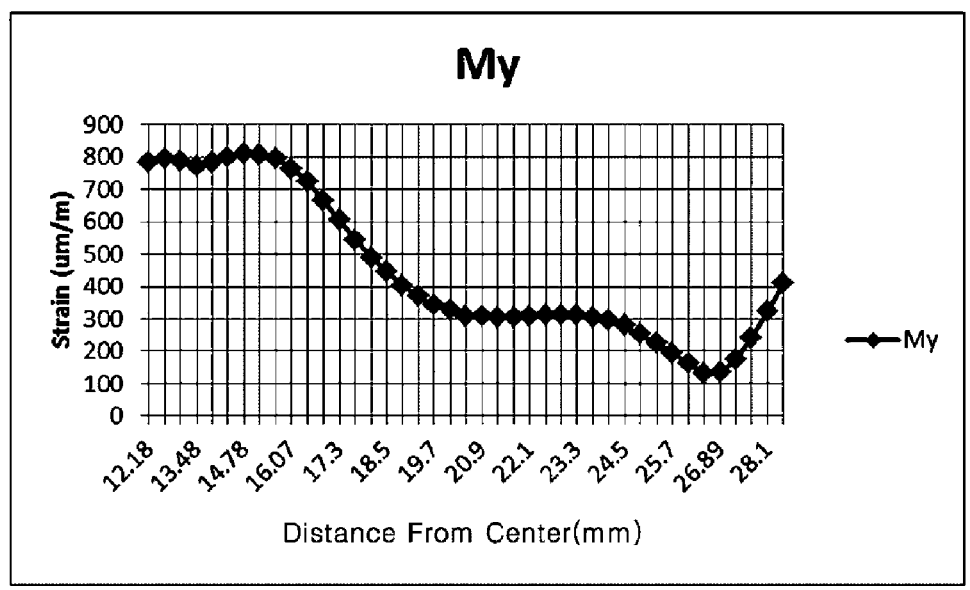

FIG. 8 is a graph showing a result of applying a torque Mx of 20 Nm in the X-axis direction and measuring a strain rate at each point of the beam 40, and FIG. 9 is a graph showing a result of applying a torque My of 20 Nm in the Y-axis direction and measuring a strain rate at each point of the beam 40.

Referring to FIGS. 8 and 9, in the section between about 14.35 mm and about 15.64 mm from the center of the hub 30, the difference between the maximum value and the minimum value of the strain rate is 20 um/m or less. In addition, in a section between about 20.5 mm and about 23.7 mm from the center of the hub 30, a difference between a maximum value and a minimum value of the strain rate is 20 um/m or less.

Figure 10:
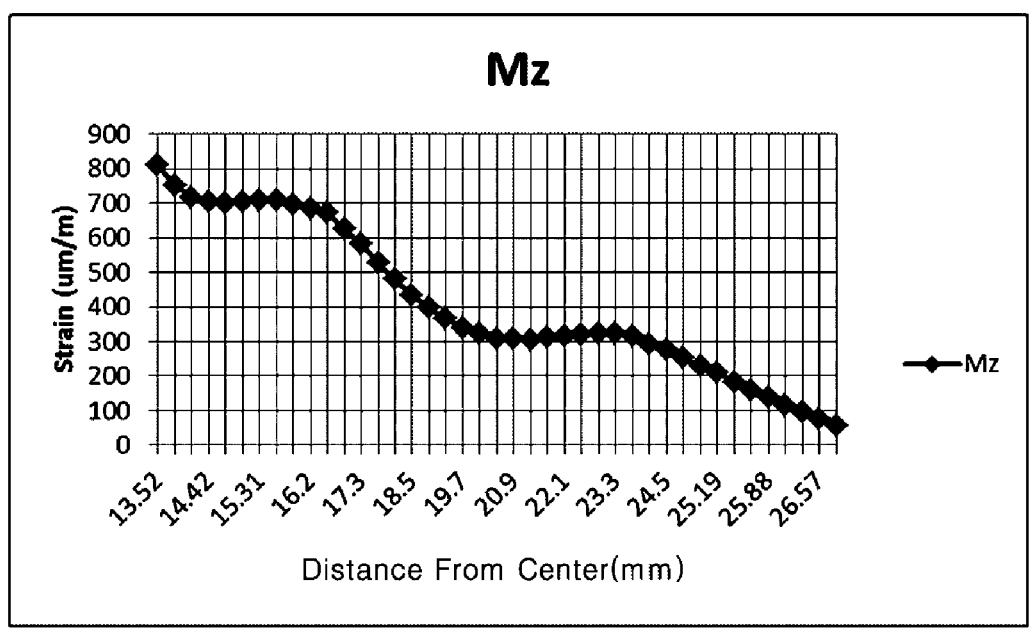

FIG. 10 is a graph showing a result of applying a force Mz of 20 Nm in the Z-axis direction and measuring a strain rate at each point of the beam 40.

Referring to FIG. 10, in a section between about 14.42 mm and about 15.91 mm from the center of the hub 30, the difference between the maximum value and the minimum value of the strain rate is 20 um/m or less. In addition, in a section between about 21.7 mm and about 23.7 mm from the center of the hub 30, a difference between a maximum value and a minimum value of the strain rate is 20 um/m or less.

Referring to FIGS. 5 to 10, as a result of applying the force or torque in directions of the X axis, Y axis, and Z axis and measuring the strain rate in the second embodiment, in one or more sections having a length of 1.5 mm to 2.0 mm in a longitudinal direction of the beam 40, the difference between the maximum value and the minimum value of the strain rate is 20 um/m or less.

In the second embodiment, it is possible to measure a strain rate having a minimized measurement error by attaching the strain gauges 25 and 26 such that the measurement centers thereof are positioned in the section. The advantage of the second embodiment is to provide accuracy of measurement of the strain rate as well as to provide convenience in producing the force torque sensor 100a.

Figure 11:
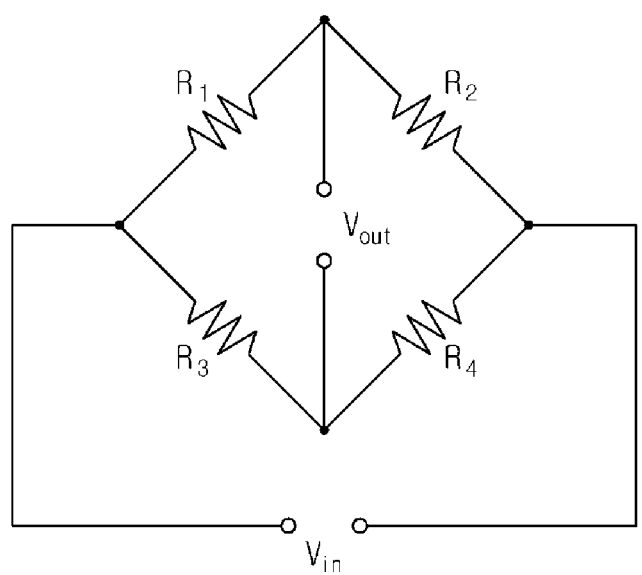
FIG. 11 is an exemplary diagram showing a Wheatstone bridge circuit for calculating the strain rate according to a third embodiment of the present invention.

FIG. 11 is an exemplary diagram showing a Wheatstone bridge circuit for calculating the strain rate according to a third embodiment of the present invention. FIG. 12 is a view showing values of the strain rates measured by each of the strain gauges 1 to 24 according to the third embodiment. FIG. 13 is a view showing a result of calculating the strain rates in each axis direction according to the result of the FIG. 12.

In the third embodiment, 24 strain gauges 1 to 24 are attached to a frame of the force torque sensor 100a of the second embodiment, the same force or torque as in the second embodiment is applied, and then a strain rate due to the force or torque is measured.

Referring to FIG. 11, the Wheatstone bridge circuit satisfies the following equation.

$$Vout = \frac{R_1 R_3 - R_2 R_4}{(R_1 + R_2)(R_3 + R_4)} Vin \quad \text{[Equation 1]}$$

R1: Resistance value of strain gauge
R2: Fixed resistance value
R3: Fixed resistance value
R4: Fixed resistance value
Vin: Input voltage
Vout: Output voltage In this case, if it is assumed that R1, R2, R3, and R4 are the same resistance value R, a variation in the resistance due to the force or torque is ΔR, and a variation in the output voltage is ΔVout, the following equation is established.

$$\Delta Vout = \frac{\Delta R}{4R + 2\Delta R} Vin \quad \text{[Equation 2]}$$

R: Resistance value
ΔR: Variation in resistance R
Vin: Input voltage
ΔVout: Variation in output voltage However, since ΔR is insignificant compared to R (ΔR<<R), the following equation is established.

$$\Delta Vout = \frac{Vin}{4} \frac{\Delta R}{R} = \frac{Vin}{4} K\varepsilon \quad \text{[Equation 3]}$$

R: Resistance value
ΔR: Variation in resistance R
Vin: Input voltage
ΔVout: Variation in output voltage
K: Proportional constant
ε: Strain rate Through the above process, the strain rate may be measured according to output voltage values caused by variation in resistance of each of the strain gauges 1 to 24

FIG. 12 shows values of strain rates measured using respective strain gauges 1 to 24 in this way.

Referring to FIG. 12, a column for Strain No. indicates a number of the strain gauge that measures a strain rate due to a force or torque.

A column for Fx indicates that a force has been applied in the X-axis direction, a column for Fy indicates that a force has been applied in the Y-axis direction, and a column for Fz indicates that a force has been applied in the Z-axis direction.

A column for Mx indicates that a torque has been applied in the X-axis direction, a column for My indicates that a torque has been applied in the Y-axis direction, and a column for Mz indicates that a torque has been applied the Z-axis direction.

A row for a strain gauge set indicates a strain rate at a position at which each strain gauge for sensing a weight is attached.

A row for a strain gauge set for sensing Fx indicates strain rates at positions at which the four strain gauges 1, 2, 3, and 4 are attached to sense a force in the X-axis direction, a row for a strain gauge set for sensing Fy indicates strain rates at positions at which the four strain gauges 5, 6, 7, and 8 are attached to sense a force in the Y-axis direction, and a row for a strain gauge set for sensing Fz indicates strain rates at positions at which the four strain gauges 9, 10, 11, and 12 are attached to sense a force in the Z-axis direction.

A row for a strain gauge set for sensing Mx indicates strain rates at positions at which the four strain gauges 13, 14, 15, and 16 are attached to sense a torque in the X-axis direction, a row for a strain gauge set for sensing My indicates strain rates at positions at which the four strain gauges 17, 18, 19, and 20 are attached to sense a torque in the Y-axis direction, and a row for a strain gauge set for sensing Mz indicates strain rates at positions at which the four strain gauges 21, 22, 23, and 24 are attached to sense a torque in the Z-axis direction.

In a column for Fx, the stain rates measured by the strain gauge 1 and the strain gauge 2 have opposite signs. Since the strain gauge 1 and the strain gauge 2 are positioned opposite to each other with respect to the beam 40, a resistance included in one of the strain gauges 1 and 2 is tensed, and a resistance included in the other is compressed if a force is applied in the X-axis direction, thus representing the strain rate in reverse. Accordingly, the strain rates are represented in reverse, and have different signs.

In this case, absolute values of the strain rates measured by the strain gauge 1 and the strain gauge 2 have no significant difference.

Likewise, the values of the strain rates measured by the strain gauge 3 and the strain gauge 4 have opposite signs and no difference between absolute values of the measured values.

However, in the column for Fx, the values measured by the other strain gauges 5 to 24 are insignificant, but not zero. This indicates measurement errors that occur in the strain gauges 5 to 24.

Likewise, in the column for Fy, values of the strain rate measured by the strain gauges 5 to 8 have a pattern similar to the above description.

However, in the column for Fy, the row for a strain gauge set for sensing Mz has a relatively high value. Thus, a force in the Y-axis direction affects a torque in the Z-axis direction, and accordingly a relatively high strain rate is measured by the strain gauges 21 to 24 for measuring a strain rate due to a torque in the Z-axis direction.

Other measurement values may be understood to be similar, and detailed description thereof will be omitted.

FIG. 13 is a view showing a result of calculating the strain rates in each axis direction using the result of the FIG. 12.

In the third embodiment, four strain gauges are used to measure a strain rate due to a force or torque along a single axis. If it is assumed that respective strain gauges are strain gauges a, b, c, and d, the following equation is established.

$$Vout = \frac{R_1 R_3 - R_2 R_4}{(R_1 + R_2)(R_3 + R_4)} Vin \quad \text{[Equation 4]}$$

R1: Resistance value of strain gauge a
R2: Resistance value of strain gauge b
R3: Resistance value of strain gauge c
R4: Resistance value of strain gauge d
Vin: Input voltage
Vout: Output voltage In this case, when variations in R1, R2, R3, and R4 due to a force or torque are ΔR1, ΔR2, ΔR3, and ΔR4, respectively, the following equation is established.

$$\Delta Vout = \frac{(R_1+\Delta R_1)(R_2+\Delta R_2)-(R_3+\Delta R_3)(R_4+\Delta R_4)}{(R_1+\Delta R_1+R_2+\Delta R_2)(R_3+\Delta R_3+R_4+\Delta R_4)}Vin \quad \text{[Equation 5]}$$

R1: Resistance value of strain gauge a
R2: Resistance value of strain gauge b
R3: Resistance value of strain gauge c
R4: Resistance value of strain gauge d
ΔR: Variation in resistance R1
ΔR2: Variation in resistance R2
ΔR3: Variation in resistance R3
ΔR4: Variation in resistance R4
Vin: Input voltage
ΔVout: Variation in output voltage In this case, since the resistance values R1, R2, R3, and R4 of respective strain gauges a, b, c, and d are similar to each other, and ΔR1, ΔR2, ΔR3, and ΔR4 are insignificant compared to R1, R2, R3, and R4 (ΔR1<<R1, ΔR2<<R2, ΔR3<<R3, ΔR4<<R4), Equation 5 is rearranged into the following equation including strain rates according to changes in the resistance values $$\Delta Vout = \frac{1}{4}K\left(\frac{\Delta R_1}{R_1}-\frac{\Delta R_2}{R_2}+\frac{\Delta R_3}{R_3}-\frac{\Delta R_4}{R_4}\right) \quad \text{[Equation 6]}$$

$$= \frac{1}{4}K(\varepsilon_1-\varepsilon_2+\varepsilon_3-\varepsilon_4)$$

R1: Resistance value of strain gauge a
R2: Resistance value of strain gauge b
R3: Resistance value of strain gauge c
R4: Resistance value of strain gauge d
ΔR: Variation in resistance R1
ΔR2: Variation in resistance R2
ΔR3: Variation in resistance R3
ΔR4: Variation in resistance R4
Vin: Input voltage
ΔVout: Variation in output voltage
K: Proportional constant
$\epsilon_1$: Strain rate due to change in resistance value of strain gauge a
$\epsilon_2$: Strain rate due to change in resistance value of strain gauge b
$\epsilon_3$: Strain rate due to change in resistance value of strain gauge c
$\epsilon_4$: Strain rate due to change in resistance value of strain gauge d When a strain rate due to a force or torque in a single axis direction is measured by four strain gauges a, b, c, and d, and the strain gauges a and b are positioned opposite to each other with respect to a single beam, ΔR1 has a positive sign when the resistance of the strain gauge a is compressed due to a force or torque, and ΔR2 has a negative sign when the resistance of the strain gauge b is tensed.

FIG. 12 shows a result of substituting the strain rates $\epsilon 1$, $\epsilon 2$, $\epsilon 3$, and $\epsilon 4$ measured in FIG. 11 into Equation 7 having no proportional constant included in Equation 6 to calculate a strain rate.

$$\text{Calculated value of strain rate} = \frac{1}{4}(\varepsilon_1-\varepsilon_2+\varepsilon_3-\varepsilon_4) \quad \text{[Equation 7]}$$

In FIG. 13, the columns for Fx, Fy, Fz, Mx, My, and Mz and the rows for the strain gauge set for sensing Fx, the strain gauge set for sensing Fy, the strain gauge set for sensing Fz, the strain gauge set for sensing Mx, the strain gauge set for sensing My, and the strain gauge set for sensing Mz are similar to those described with reference to FIG. 12. Thus detailed description thereof will be omitted.

In a column for Fx, values of strain rates calculated by the strain gauge set for sensing Fx are found by substituting values of the strain rates measured by four strain gauges 1 to 4 into Equation 7. The calculated values of the strain rates in the other columns or rows are found through the same method.

In the third embodiment, the strain rates due to a force or torque of a single axis are measured using four sensors, and calculated values of the strains rates may be derived by performing calculation using the four measurement values, thus increasing accuracy of measurement of the strain rate, compared to a case in which a single gauge is used to measure the strain rate.

In a column for Fx, rows for a strain gauge set for sensing Fx, a strain gauge set for sensing Fz, a strain gauge set for sensing Mx, a strain gauge set for sensing My, and a strain gauge set for sensing Mz are insignificantly adjusted as a result of the calculation using Equation 7.

Likewise, in a column for Fy, a row for a strain gauge set for sensing Fy has an effective calculation value of the strain rate, and rows for a strain gauge set for sensing Fx, a strain gauge set for sensing Fz, a strain gauge set for sensing Mx, strain gauge set for sensing My, and a strain gauge set for sensing Mz are insignificantly adjusted as a result of the calculation. The above calculation result is similar to those of the other columns for Fz, Mx, My, and Mz.

Referring to the description made with reference to FIG. 12, since a force acting in the Y-axis direction affects a torque in the Z-axis direction, relatively high strain rates are measured by the strain gauges 21 to 24 that measure strain rates due to a torque in the Z-axis direction in addition to the strain gauges 5 to 8 that measure strain rates due to a force in the Y-axis direction.

However, it can be seen that such a measurement error in the calculation value of the strain rate of FIG. 13 is corrected through an operation process such as Equation 7. The final strain rate may be obtained, for example, by applying a certain proportional constant to the calculation result of Equation 7.

It should be understood that the embodiments disclosed herein are merely illustrative and are not intended to limit the scope of the invention. It will be apparent to those skilled in the art that various modifications can be made to the above-described exemplary embodiments of the present invention without departing from the spirit or scope of the invention.

What is claimed is:

1. A force torque sensor comprising:
   a central hub;
   a plurality of beams, each beam of the plurality of beams having a first end connected to the hub and a gradient shape in a longitudinal direction thereof;
   a strain gauge attached to one beam of the plurality of beams, the strain gauge being configured to measure a strain rate of the beam to which the strain gauge is attached; and
   a rim connected to a second end of each beam of the plurality of beams such that the rim surrounds the hub and the plurality of beams,
   wherein each beam of the plurality of beams has at least one curved sidewall extending between the hub and the rim, and the gradient shape comprises a convex portion of the at least one curved sidewall.

2. The force torque sensor of claim 1,
   wherein the beam has a section in which a strain rate due to a force or torque along the gradient shape is maintained below a certain value, and
   wherein the strain gauge is attached to the section.

3. The force torque sensor of claim 2, wherein the section has a length of 1.5 mm to 2.0 mm in the longitudinal direction of the beam.

4. The force torque sensor of claim 2, wherein the section has a difference between a maximum value and a minimum value of the strain rate within 20 um/m or less.

5. The force torque sensor of claim 2, wherein the strain gauge is attached such that a measurement center thereof is positioned within the section.

6. The force torque sensor of claim 1, wherein the strain gauge measures a strain rate due to a force or torque in a direction of an X axis, a Y axis, or a Z-axis.

7. The force torque sensor of claim 1, wherein the strain gauge comprises a plurality of gauges positioned on opposing surfaces of the beam to which the strain gauge is attached, the gauges of the plurality of gauges being arranged opposite to each other with respect to the beam in order to measure a strain rate in a single axis direction.

8. The force torque sensor of claim 1, wherein the strain gauge is a first strain gauge, and the force torque sensor further comprises:
   a second strain gauge attached to the beam to which the first strain gauge is attached;
   a third strain gauge attached to a second beam of the plurality of beams; and
   a fourth strain gauge attached to the second beam of the plurality of beams,
   wherein the first strain gauge and the second strain gauge are positioned opposite to each other with respect to the one beam of the plurality of beams, the third strain gauge and the fourth strain gauge are positioned opposite to each other with respect to the second beam of the plurality of beams, and the strain rate due to the force or torque in the single axis direction is measured using the first strain gauge, the second strain gauge, the third strain gauge, and the fourth strain gauge.

9. The force torque sensor of claim 1, wherein the plurality of beams are positioned symmetrically with respect to the hub.

10. The force torque sensor of claim 1, wherein a quantity of beams of the plurality of beams is four, and the four beams are arranged as a cross centered on the hub.

11. The force torque sensor of claim 1, wherein the hub, the one beam, or the rim comprises iron steel, nickel-chromium-molybdenum steel, stainless steel, tool steel, hardened stainless steel, an aluminum alloy, or duralumin.

12. A force torque sensor frame comprising:
    a central hub;
    a plurality of beams, each beam of the plurality of beams having a first end connected to the hub, a gradient shape in a longitudinal direction thereof, and a strain gauge attached thereon; and
    a rim connected to a second end of each beam of the plurality of beams such that the rim surrounds the hub and the plurality of beams,
    wherein each beam of the plurality of beams has at least one curved sidewall extending between the hub and the rim, and the gradient shape comprises a convex portion of the at least one curved sidewall.

13. The force torque sensor frame of claim 11, wherein the beam has a section in which a strain rate due to a force or torque along the gradient shape is maintained below a certain value, and the strain gauge is attached to the section.

14. The force torque sensor frame of claim 11, wherein the hub, the beam, or the rim comprises iron steel, nickel-chromium-molybdenum steel, stainless steel, tool steel, hardened stainless steel, an aluminum alloy, or duralumin.

15. A force torque measurement method using a force torque sensor including a central hub; a plurality of beams, each beam of the plurality of beams having a first end connected to the hub, and a rim connected to a second end of each beam of the plurality of beams such that the rim surrounds the hub and the plurality of beams, the force torque measurement method comprising:
    a processing step of forming a gradient shape in a longitudinal direction thereof such that each beam of the plurality of beams has a section in which a strain rate due to a force or torque is maintained below a certain value;
    an attachment step of attaching a strain gauge to the section; and
    a measurement step of measuring the strain rate in a direction of an X axis, a Y-axis, or a z-axis using the attached strain gauge,
    wherein each beam of the plurality of beams has at least one curved sidewall extending between the hub and the rim, and the gradient shape comprises a convex portion of the at least one curved sidewall.

* * * * *